L. F. ADT.
EYEGLASSES.
APPLICATION FILED JAN. 18, 1905.
999,726. Patented Aug. 8, 1911.
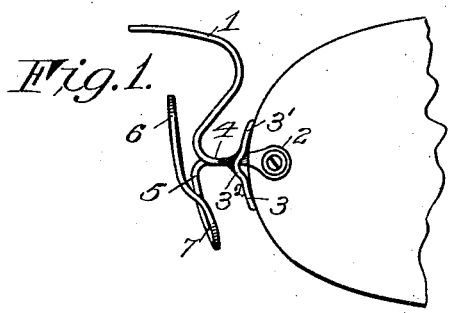
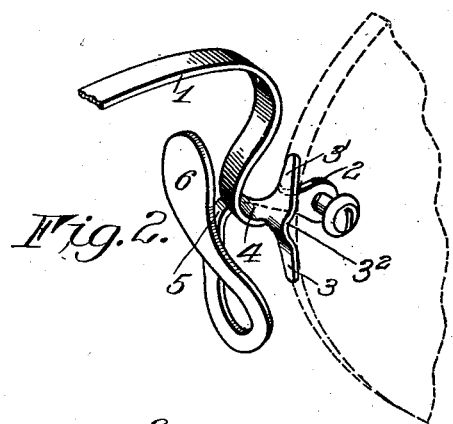
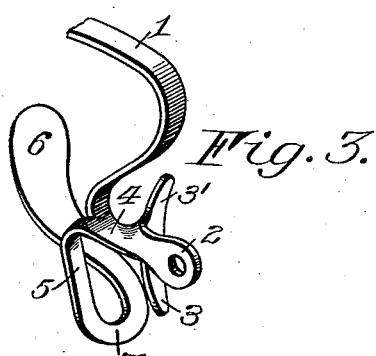
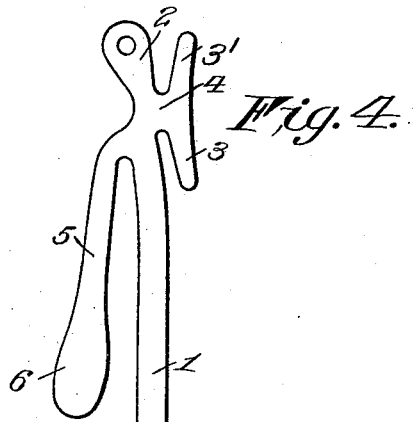
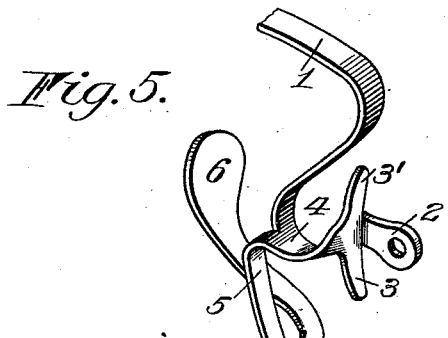

UNITED STATES PATENT OFFICE.

LEO F. ADT, OF TROY, NEW YORK.

EYEGLASSES.

999,726.  Specification of Letters Patent.  Patented Aug. 8, 1911.

Application filed January 18, 1905. Serial No. 241,609.

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to eyeglasses and has for its object to provide an improved mounting therefor embodying the spring or bridge, the lens attaching and steadying lugs or ears and the nose bearing pads or guards which may be readily stamped out of sheet metal and formed up requiring only two screws, and their coöperating washers to form a complete mounting.

A further object of the invention is to provide a mounting which when in use presents only the edge of the metal parts to view thereby rendering it less conspicuous particularly at the portions between the ends of the bridge or spring and the lens. Its further object is to form the spring or bridge and the guard of a single piece of sheet material so cut that these parts extend in opposite directions from the outwardly extending portion or shank forming a connection with the lenses, the flat faces of the edge of the material of the shank and of the ends of the spring and guard extending in planes transversely of the plane of the faces of the lenses.

To these and other ends it consists in certain improvements hereinafter described the novel features being pointed out in the claims at the end of the specification.

In the drawings: Figure 1 is a front elevation of a portion of an eyeglass mounting embodying my improvements. Figs. 2 and 3 are perspective views of the same. Fig. 4 is a blank from which the mountings are formed. Fig. 5 is a perspective view of a modification.

In making the mounting shown in Figs. 1 and 2 I first stamp out of sheet metal preferably more or less resilient and suitable for forming the spring, a blank shown in Fig. 4 embodying the connecting portion 1 which constitutes the spring in eyeglasses or the bridge in spectacles and at the ends thereof and arranged at a slight angle thereto are the lens attaching lugs 2. At one side of each of the ends of the blank are formed the lens edge bearing ears 3, 3′ extending from the shank 4 and from the other side extend the nose guards 5, preferably formed of the long arms with the laterally enlarged bearing pads 6 at their ends. The blank thus formed is bent up into the form shown in Figs. 1, 2 and 3 the shank of the lens attaching lugs 2 being given a half turn or twist to cause them to lie parallel with one face of the lens, preferably the rear and the edge-bearing lugs or ears 3, 3′ are turned up and down respectively, a slight ridge or corrugation $3^2$ being formed at the base of the latter.

The shanks of the nose guards are, in the embodiment shown bent downwardly at their attaching ends and then edgewise of the metal forwardly and upwardly and rearwardly, forming the loops 7 which lie against the nose of the wearer, and the upper ends having the bearing pads 6 are in rear of the lenses. The ends of the connecting portion or spring 1 are bent upwardly at their attaching ends, then outwardly toward the lenses and then arched at the central portion as usual, or formed in any desired way to permit the guards to be separated either by an upward or forward movement of the lenses. It will be noted that in this mounting the metal is presented edgewise when viewed from the front and nearly all the bends are toward the flat sides of the blank which facilitates the operation, the twist necessary to bring the lens attaching lug 2 into proper position on the face of the lens not being sufficiently short to unduly strain the metal. Furthermore, the shanks between the depending ends of the spring and the attaching and bearing ears and lugs extending in a plane substantially parallel with the axis of the lenses renders this mounting particularly adapted for that class of glasses wherein the nose guards are separated by a movement of the lenses in a horizontal plane as the strain upon the shanks is then in the direction of these edges.

The blank for making the modification shown in Fig. 5 is slightly different from the other in respect to the lugs and ears 2, 3 and 3′, the twist necessary to bring the lug 2 into the proper plane being made in the shank between the ears 3 and 3′ and the connecting portion of the spring or bridge. In this construction the blank is formed with the attaching lug in substantially the plane of the connecting portion or bridge and the lugs 3, 3' extend laterally therefrom but in both forms the metal except that of the attaching lug, is presented edgewise when viewed from the front and the inner end of the spring and nose guards are away from the edge of the lenses producing a spring narrow at the base or lower end and allowing considerable space between the centers of the lenses for pupillary distance without unduly enlarging the lenses.

The feature of having the guard arms and the spring or bridge ends extend downwardly and upwardly from flat shanks or posts which are connected to the lenses is advantageous, even though the outer ends of said shanks are not provided with integral attaching lens ears or lugs, as in the present embodiment, but are attached by other means to the lenses or to other parts of the mountings, because by forming the upward bend of the spring and the downward bend of the guard arm 5 or both nearer to or farther from their point of connection, the distance between the effective or grasping portion of the guards may be varied so that the same mounting can be employed for persons having different pupillary distances. Even though these parts are caused to diverge at a greater distance from their point of connection than that shown, in order to increase the distance between the optical axes of the lenses, the edges alone will extend substantially parallel with said axes, which will render the mounting inconspicuous and will also provide attaching posts extending inwardly from the lenses.

While the invention has been described as an eyeglass mounting, I do not intend to confine myself to an eyeglass mounting in which the bridge 1 is made of spring material as it will be apparent that this mounting is adapted for that type of eyeglasses which are termed specifically spectacles.

I claim as my invention:

1. The combination with the lenses, of a frame formed of a single piece of sheet material and comprising a connecting portion, lens attaching ears at its ends extending parallel with the faces of the lenses, lens edge-bearing lugs, shanks extending inwardly from the edges of the lenses, guards, and depending ends on the connecting portion, all of flat material with the broader faces extending substantially at right angles to the plane of the faces of the lenses thereby presenting only the edges of the material when viewed from the front.

2. The combination with the lenses, of a frame formed of a single piece of sheet metal and embodying a connecting portion having depending ends, shanks extending outwardly from said ends, upwardly and downwardly extending lugs engaging the edges of the lenses, lens attaching ears extending flatwise over the face of the lenses, and guards extending downwardly from the shanks, the said depending ends, shanks and lugs having their broader faces extending substantially at right angles to the planes of the faces of the lenses, thereby presenting only the edges of the metal when viewed from the front.

3. In eyeglasses, the combination with the lenses, of a mounting embodying a bridge and nose guards having outwardly-extending attaching portions, integral connecting portions joining the said attaching portions of the bridge and guards at points in substantially the same horizontal plane and forming outward continuations of said attaching portions to serve as lens-attaching shanks, and devices for attaching the lenses to the outer ends of said shanks.

4. In eyeglasses, the combination with the lenses, of a mounting embodying a bridge and nose guards formed integrally of flat material and having their attaching ends extending outwardly, one in rear of the other, lens-connecting portions formed integrally with the bridge and guards and joining the attaching ends thereof at points in the same horizontal plane, and devices for attaching the outer ends of said lens-connecting portions to the respective lenses.

5. In eyeglasses, the combination with the lenses, of the shanks or posts composed of flat material and extending inwardly therefrom, and the spring and guard arms forming upward and downward continuations of the shanks, the flat surfaces of said spring and guard arms and posts extending substantially parallel with the optical axes of the lenses to present the material edgewise when viewed from the front.

6. A blank for eyeglass mountings composed of pliable material embodying a bridge or connecting portion, portions adapted to be formed into nose guards, return bends uniting the ends of said bridge and nose-guard portions and adapted to form lens-connecting shanks or posts, portions connected to the bends substantially in line with the bridge portion to form lens ears, and portions also connected to the bends and lying substantially parallel to the connecting portion to form lens edge bearing members.

7. A blank for eyeglass mountings composed of flat sheet material embodying a connecting portion having lens attaching ears at the ends and substantially in line therewith, edge-bearing lugs located at one side of the ends of the connecting portion and extending substantially parallel therewith, and guard arms extending laterally from the ends of the connecting portion as shown and described.

8. The combination with a lens, of a support therefor embodying a flat shank or post extending toward the edge of the lens with its flat surfaces parallel with the optical axis of the lens, a flat attaching ear extending over the surface of the lens, and edge bearing ears intermediate the shank and attaching ear.

9. The combination with a lens, of a support therefor composed of sheet material embodying a lens attaching ear having its flat surface in contact with the face of the lens, a shank with its flat surfaces extending substantially parallel with the optical axis of the lens and connected to the attaching ear by a torsionally twisted portion, and a lens edge bearing portion intermediate the attaching ear and shank.

10. The combination with lenses, of a mounting formed of sheet metal having an intermediate connecting portion, shanks at the ends extending outwardly therefrom with their flat surfaces substantially parallel with the optical axes of the lenses, and nose guards extending downwardly from the sides of the ends of the connecting portion with the flat surfaces of each formed with a flatwise bend and being a continuation of the faces of the shanks.

11. An eyeglass mounting comprising a bridging portion, a nose guard, a lens attaching ear, and a shank portion integral with the bridging portion, secured to the lens attaching ear and having the guard secured thereto in a horizontal plane with the end of the bridging portion.

12. An eyeglass mounting formed from a single piece of flat stock and comprising a bridging portion, nose guards and outwardly extending shanks, the flat faces of the stock forming the shanks being arranged horizontally and the guards and the bridging portion proceeding from the inner ends of the shanks in the same horizontal plane.

LEO F. ADT.

Witnesses:
CLARENCE A. BATEMAN,
F. N. HOWARD.

---

Copies of this patent may be obtained for five cents each, by addressing the "Commissioner of Patents, Washington, D. C."